(12) United States Patent
Schuda et al.

(10) Patent No.: US 6,269,888 B1
(45) Date of Patent: Aug. 7, 2001

(54) RECIPROCATING AND ROTARY POWER TOOL

(75) Inventors: David J. Schuda, Lombard; Barbara Perozek, Evanston; David Iverson, Chicago, all of IL (US)

(73) Assignee: Hand Tools International, LLC, Lake Zurich, IL (US)

( * ) Notice: Subject to any disclaimer, the term of this patent is extended or adjusted under 35 U.S.C. 154(b) by 0 days.

(21) Appl. No.: 09/387,714

(22) Filed: Aug. 13, 1999

(51) Int. Cl.⁷ .............................. E02D 7/07; B23B 45/16
(52) U.S. Cl. ........................ 173/48; 173/205; 173/217
(58) Field of Search .......................... 173/48, 47, 29, 173/205, 178, 217; 15/22.1, 22.2; 74/22 A, 22 R; 200/5 B, 1 V; 81/473

(56) References Cited

U.S. PATENT DOCUMENTS

| | | | |
|---|---|---|---|
| 3,171,286 | * 3/1965 | Stewart | 173/48 |
| 3,379,906 | * 4/1968 | Spohr | 15/22.1 |
| 3,802,518 | * 4/1974 | Albert | 173/29 |
| 3,847,229 | * 11/1974 | Wanner et al. | 173/48 |
| 3,908,108 | * 9/1975 | Hults | 200/5 B |
| 4,223,744 | * 9/1980 | Lovingood | 173/48 |
| 4,229,981 | * 10/1980 | Macky | 173/48 |
| 4,428,438 | * 1/1984 | Holzer | 173/48 |
| 4,489,792 | * 12/1984 | Fahim et al. | 173/48 |
| 5,089,729 | * 2/1992 | Moores, Jr. | 200/1 V |
| 5,576,501 | * 11/1996 | Huang | 81/473 |
| 5,664,634 | * 9/1997 | McCracken | 173/48 |

* cited by examiner

*Primary Examiner*—Scott A. Smith
(74) *Attorney, Agent, or Firm*—Fitch, Even, Tabin & Flannery

(57) ABSTRACT

An apparatus is provided that allows a working element to undergo either rotary or reciprocation motion in a transmission system that is very compact in terms of the amount of space it requires to convert the rotary output of the motor into either rotary or reciprocating output of an output shaft operably connected to the working element. The transmission includes input and output members between which a clutch and cam mechanism are disposed for providing a rotary/reciprocating transmission system with a compact design. When the clutch is disengaged, the cam mechanism is operable to provide the output member and thus the output shaft connected thereto with reciprocating motion. Preferably, the output member is cylindrical with the input member, clutch and cam mechanism all disposed therein to provide the rotary/reciprocating tool with a so-called "barrel cam" transmission that is small to provide significant space saving in the tool housing.

23 Claims, 13 Drawing Sheets

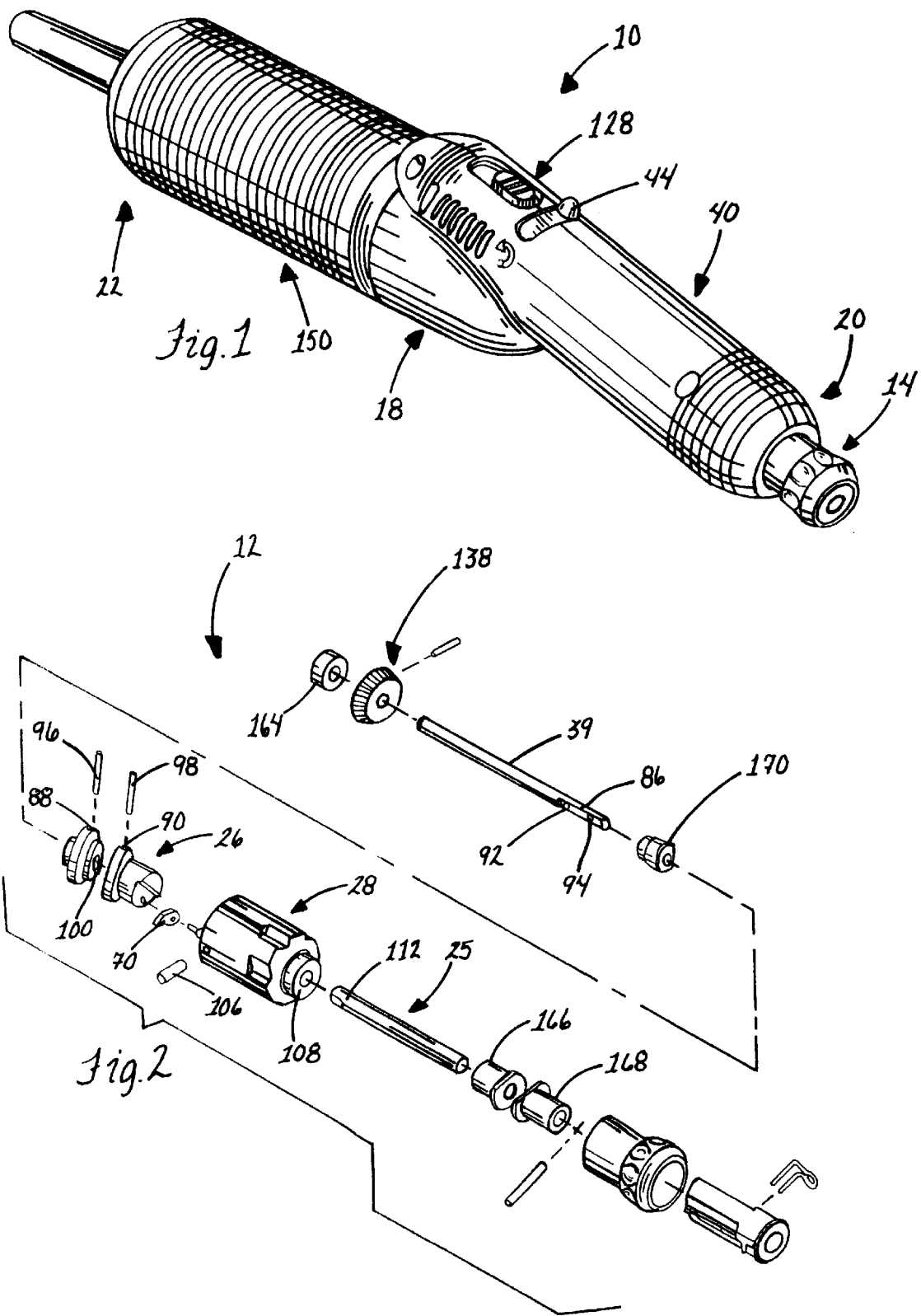

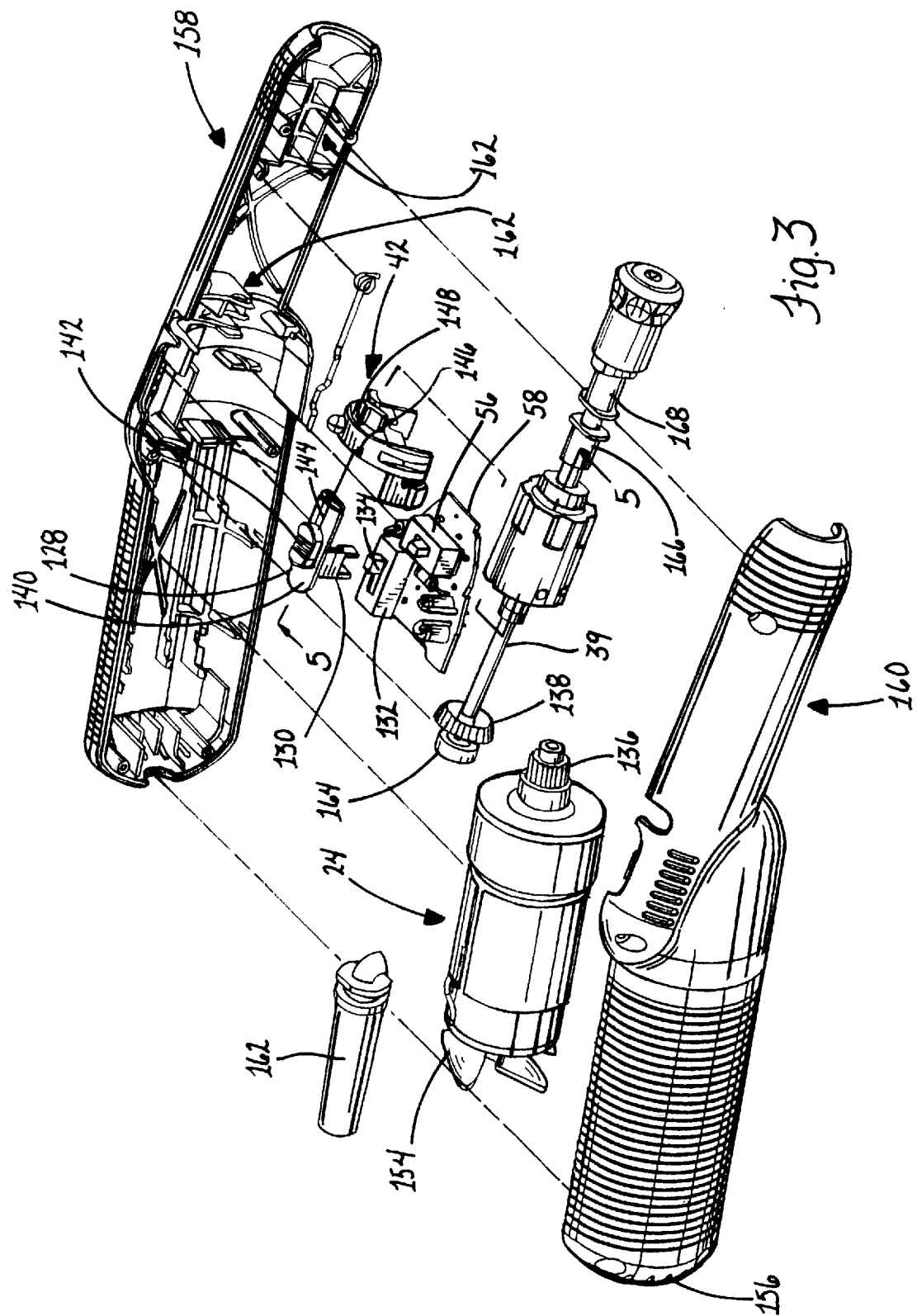

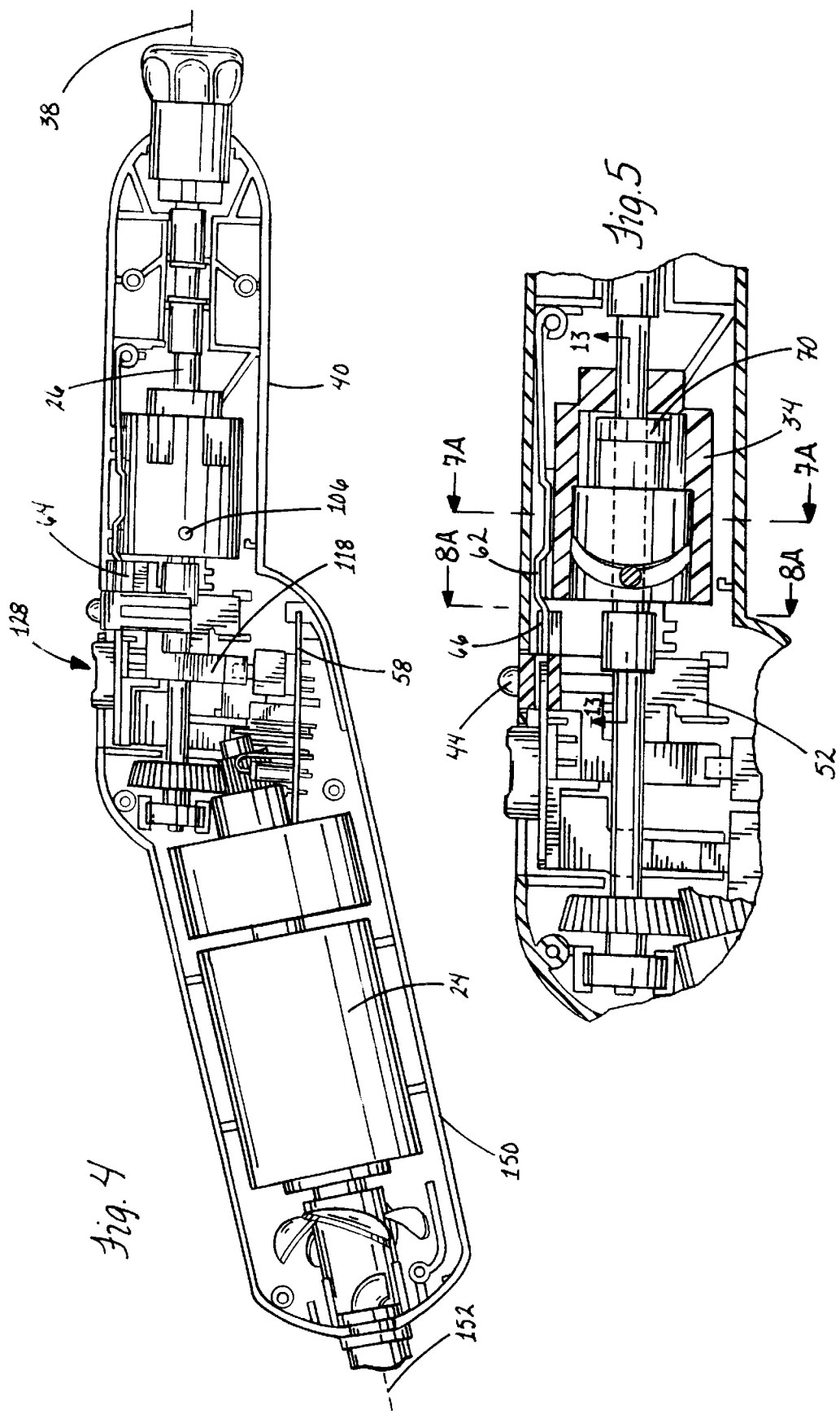

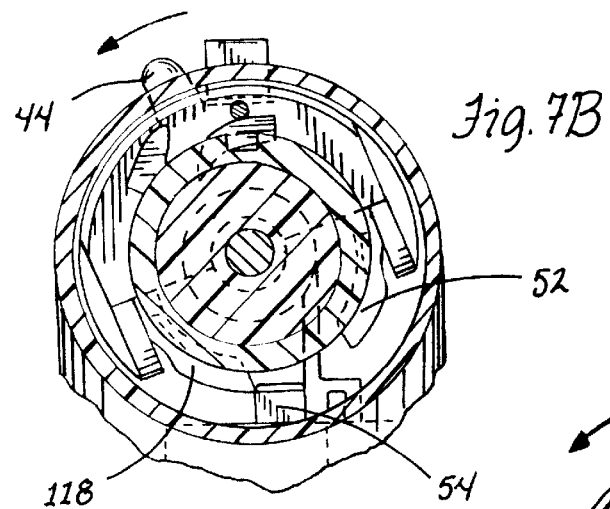
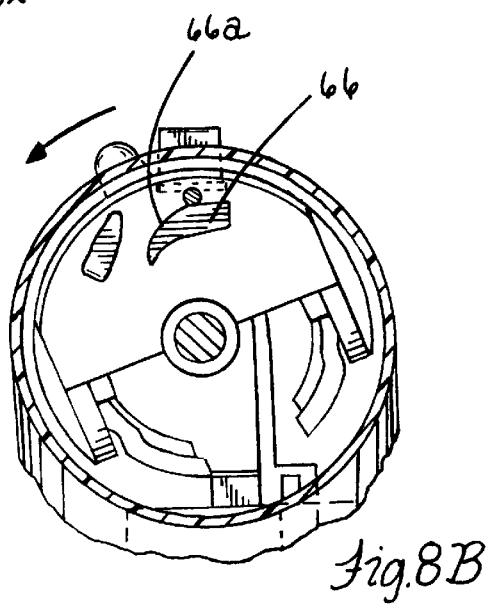
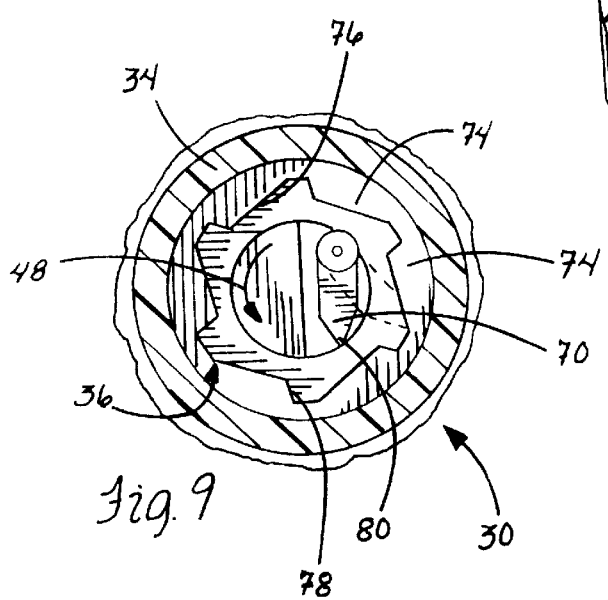
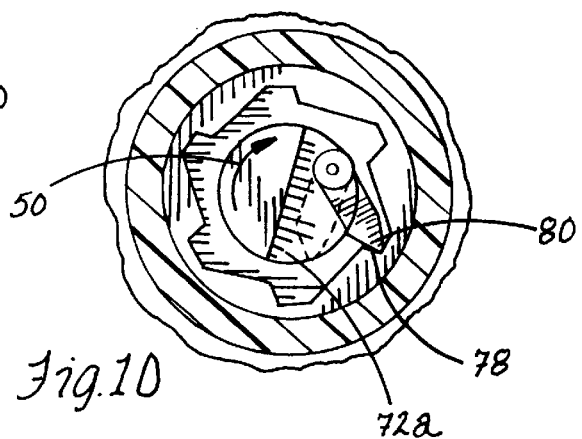

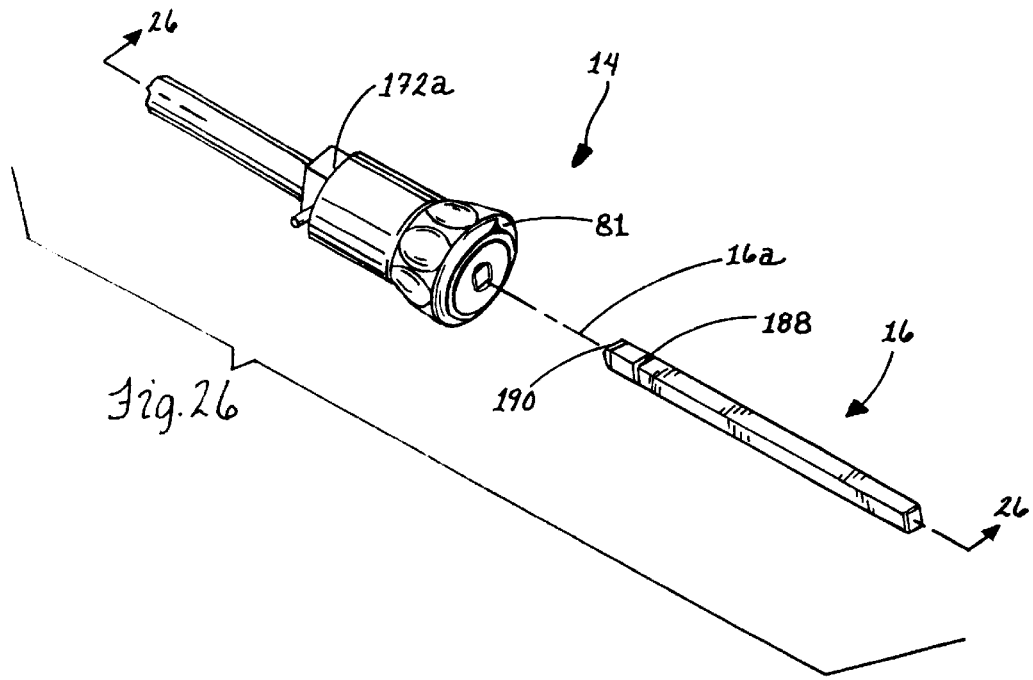
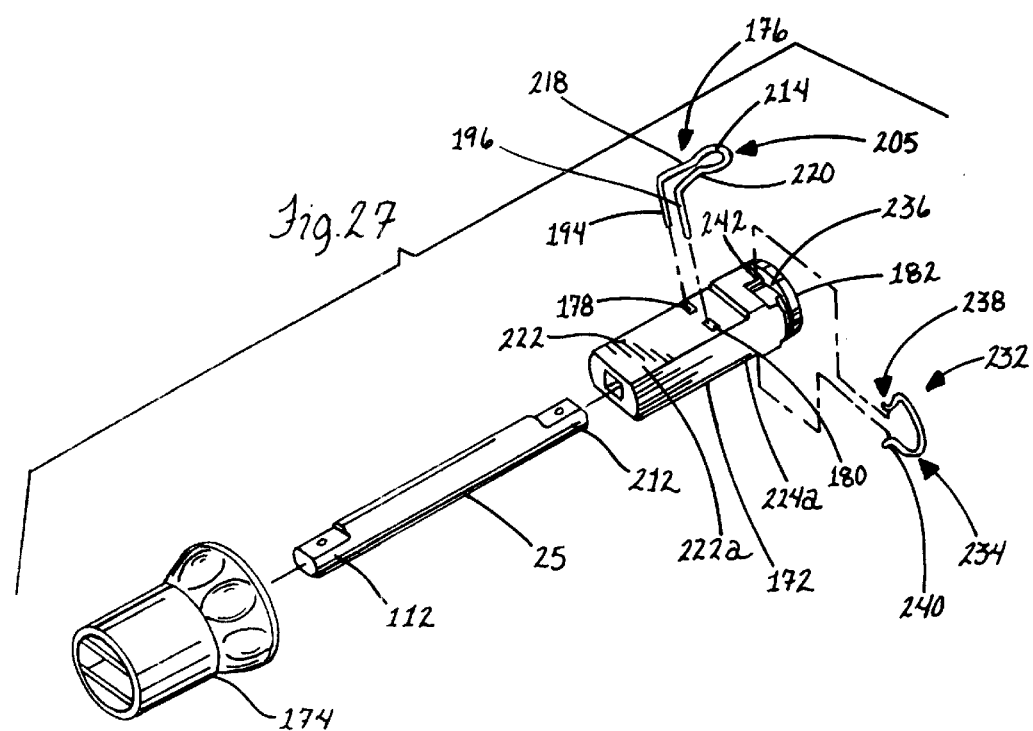

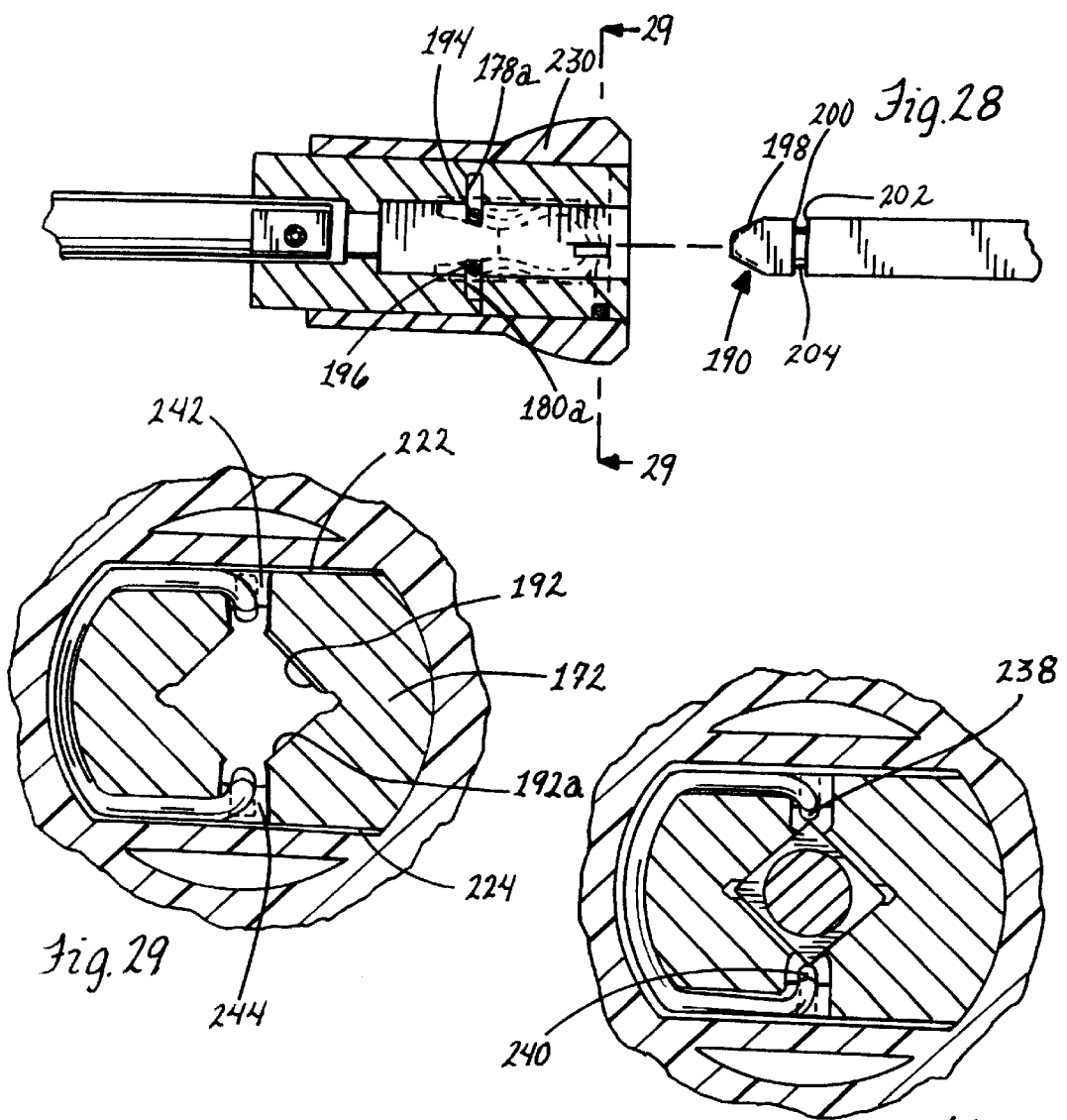
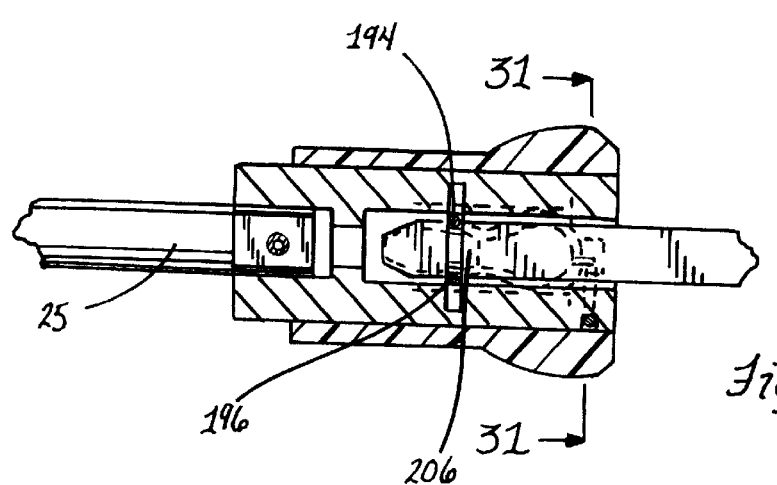

RECIPROCATING AND ROTARY POWER TOOL

FIELD OF THE INVENTION

The invention relates to a power tool that provides a working element with either reciprocating or rotary motion and, in particular, to a compact and sturdy transmission system thereof.

BACKGROUND OF THE INVENTION

There is a need for a hand-held power tool that has the capability to clean surfaces, such as by brushing and buffing, which may otherwise be difficult to effectively clean, such as on automobiles, particularly in their interiors. Although in one form a cleaning tool is described, it should be noted the applications for the power tool herein are more broad based. There are a variety of household and lobby uses to which the present tool can be put such as: sanding, filing, sawing, brushing, polishing, dusting, scraping, wood carving, and cutting.

Automobile owners generally clean the exterior surfaces of their cars on a fairly regular basis either themselves or by running their car through an automatic carwash such as at gasoline stations. These automatic carwashes utilize high pressure jets of cleaning solution sprayed at the cars as they are run through the carwash and have rotating apparatuses carrying rag-type cleaning elements and/or brush bristles which are moved to a position adjacent the car so as to contact the car's exterior surface as they are rotated. While these carwashes are quick, they are generally no substitute for a manual detailing of the car's surfaces, especially those surfaces which can be buffed to a high shine such as chrome and other metallic surfaces and those surfaces which are hard to access such a between parts. Automated carwashes typically do not have the capacity for such specified cleaning and can not approach the cleaning job obtained through a manual detailing where a person can apply precise pressure to difficult-to-clean spots, such as where there is dirt buildup and can buff specific surfaces until they are shined sufficiently.

With respect to the car's interior surfaces, particularly those that are difficult to access, such as the surfaces on and around the doors, dashboard and steering, column, these surfaces are subject to cleaning on a much more infrequent basis than the car's exterior and are generally only cleaned when a car is taken in to be detailed at a full-service carwash after an automated washing of the car's exterior. As molding techniques for producing car parts have become more advanced, these interior parts have correspondingly taken on a wider variety of shapes and configurations which can make them more difficult to access and clean. Because of the lack of regular cleaning, these surfaces can get fairly dirty with grime and dust which builds up over lengthy periods of time. In order to clean these surfaces, workers at full-service carwashes generally use a wide variety of different types of cleaning solutions applied to the surfaces designed to cut through the dirt buildup thereon with the surfaces being wiped down by brushes, rags and the like. As with the exterior detailing, to ensure a good cleaning job for these surfaces, the rags or other cleaning elements must be wiped against the surface with a certain amount of pressure so as to remove the dirt buildup thereon. Where the surfaces are difficult to access, it is also difficult for a worker to obtain the proper leverage to apply the pressure required to ensure a thorough cleaning of the surface. Oftentimes, the workers will open the car door when cleaning the car's interior surfaces and position themselves so their legs are on the ground outside the car while they clean the underneath surfaces on and near the dashboard and steering column areas in the car so as to be able to gain the leverage to exert the pressure required on these surfaces for removing the accumulated dirt thereon. As carwashes can be high volume facilities where workers are driving cars to various locations thereabout, the requirement that workers position themselves partially outside the car to clean car interior surfaces can present a potentially hazardous situation.

As is apparent from the above, cleaning and detailing the surfaces of a car is a difficult and laborious task which may explain why car owners do not often perform this task themselves, or at least on a more regular basis as with each washing of the car exterior. It also explains the presence of such detailing facilities as car owners would rather pay someone else the money to detail their car rather than exert the time and effort required if they were to do it themselves. Such non-automated detailing can be fairly expensive, particularly if one desires to keep their car detailed on a regular basis. Thus, there is a need for a hand-held power tool which can be used to clean and buff surfaces, such as on a car. It would be desirable for the power tool to have a working element which can be rotated or reciprocated such as against a surface to be cleaned so as to provide the tool with greater flexibility such as in cleaning surfaces having different orientations and various configurations and which otherwise would be difficult to effectively clean either manually or in an automatic carwash.

In prior tools that have dual modes for providing the working element with different types of motions, the transmission between the motor and working element typically is very complicated using a large number of force transmitting components, i.e. gears, shafts, cams and levers. In many hand-held power tools manufacturing and assembly costs are very important, particularly where the tool is for retail sale such as to the do-it-yourself market. In this regard, the complicated transmissions of prior tools in this area do not lend themselves to low cost manufacture and assembly. In addition, their large number of components can make assembly thereof difficult and complex.

Another shortcoming is that generally these complicated transmissions require more space for their components making the tool larger than desirable for hand-held operations. For example, where counter-shafting is utilized, the housing for the tool has to provide sufficient space in the lateral direction for the primary and secondary shafts and rotating components that may be mounted thereon.

The collet design is another important feature in power tools. Again, many prior collets utilize a large number of parts which undesirably raises complexity and costs associated with their manufacture and assembly. In prior collets the use of detent balls that cooperate with precisely formed grooves in pilot shafts of the bits is commonplace. With detent balls, ramp surfaces on the collet and/or shaft are typically provided to allow the shaft to be releasably held by the collet. These ramp surfaces have to be formed to very exacting tolerances to achieve secure mounting of the shaft in the collet during tool operation while also allowing the shaft to release from the collet when desired.

In many prior collets, a user is required to slide the collet rearwardly toward the tool housing in order to release the bit shaft from the collet. This rearward sliding can be a problem as the unintended application of a rearward directed force on the collet can inadvertently cause the shaft to be released from its held condition in the collet. This can cause damage to the work as well as create a safety hazard for the tool operator.

Accordingly, there is a need for a hand-held power tool that provides the capability of driving a working element for two distinct motions thereof, i.e. rotation and reciprocation, while still having a compact transmission system. Such a power tool should have a sturdy, heavy duty transmission for generating rotary and reciprocating action of the working element as the working element will often be applied with some pressure such as by a worker using the tool against a surface to be cleaned. The tool should be ergonomically designed so that it can be gripped at a variety of locations along its housing to accommodate the areas it must reach while also allowing an operator to exert the appropriate amount of control and pressure on the working element. There is a need for a tool that minimizes the risk of inadvertent release of the bit shaft as releasably held in the collet of the tool. Further, an easier to manufacture and assemble collet would be desirable.

For dual mode tools, a mechanism which prevents a user from shifting the tool from its rotating mode to its reciprocating mode while the tool is being operated to avoid shock loads on the gears and shafting of the transmission system and stripping of gear teeth would be desirable. Finally, the power tool should be capable of being used with a wide variety of working elements which can be easily and quickly interchanged with each other for use with the tool.

SUMMARY OF THE INVENTION

In accordance with the present application, an apparatus is providing that allows a working element to undergo either rotary or reciprocating motion via a transmission system that is very compact in terms of the amount of space it requires to convert the rotary output of the motor into either rotary or reciprocating output of an output shaft operably connected to the working element. To this end, the invention has a barrel cam transmission including input and output members between which a clutch and cam mechanism are disposed for providing a rotary/reciprocating transmission system with a compact design. The transmission, and in particular the clutch and cam mechanism thereof, has a sturdy construction to allow it to withstand shock forces such as axial loading that may be placed on the working element and transmitted to the transmission system during tool operations without disruption of the same.

In one form of the invention, an apparatus having a working element capable of rotating or reciprocating is provided. The apparatus includes an elongate housing having a first longitudinal axis extending therethrough and a reversible motor in the housing having forward and reverse states. An input member is driven in either one forward or reverse directions of rotation by the motor. An output member provides the working element with either rotary motion or a reciprocating motion. A clutch is provided between the input and the output members and has an engaged condition with the input member rotating in one of the forward or reverse directions and a disengaged condition with the input member rotating in the other of the forward or reverse directions. A cam mechanism between the input and output members causes the output member to reciprocate and provide the working element with reciprocating motion with the clutch in the disengaged condition.

In a preferred form, the output has a cylindrical portion defining an interior space and the input member, clutch and cam mechanism are all disposed in the interior space to provide a compact rotary/reciprocating transmission system in the housing. The compact transmission system herein is advantageous in that the housing for the power tool can be relatively small to allow users to more readily manipulate the tool over prolonged periods of time and into difficult to access areas.

In one form, the clutch is a one-way clutch including a pivotal pawl and teeth. In the engaged condition, the pawl is pivoted to lock into one of the teeth to cause the input and output members to rotate together and in the disengaged condition the pawl cams over the teeth to allow the input member to rotate relative to the output member. More than one pawl can be provided for locking into more than one respective teeth of the clutch. Further, the clutch can include a biasing member for urging the pawl toward the teeth. The present clutch provides for secure locking of the pawl in the teeth when the clutch is in its engaged condition to limit unintended clutch disengagement such as due to applied loads on the transmission via the working element.

A control actuator can be provided for shifting the motor between either one of its forward and reverse states. A holding or stop member is shifted by the control member between inoperative and operative positions. In the inoperative position, the output member rotates with the input member in one direction with the clutch in the engaged condition. In the operative position, the output member reciprocates via the cam mechanism and the input member rotates in the other direction with the clutch in the disengaged condition.

Preferably, the holding member is a resilient member that is mounted in the housing at a fixed position relative to the rotation of the output member. The output member includes a seat for receiving the resilient member in its operative position so that with the resilient member in the seat, the output member is held against rotation with the seat at the fixed position and the resilient member is allowed to slide in the seat so that the output member reciprocates in a predetermined orientation thereof. As the output member is operably connected to the working element vis-a-vis an output shaft and collet, a user will be able to position the working element in a known, predetermined position in the collet so that it reciprocates in a predetermined orientation thereof. In this regard, the collet can have a visible indicia provided thereon which indicates to the user the position the collet will be in when it is undergoing reciprocating motion.

In one form, a motor on/off switch is mounted to the housing and is selectively movable between and "off" position with the motor de-energized and "on" position with the motor energized to drive the input member. With the switch in the "on" position, the switch interlocks with the control to prevent selective movement thereof precluding the motor from being shifted from one state to the other while it is energized. In this manner, the switch prevents the control from being operated while the motor is running and the transmission is in either the rotary or reciprocating mode of operation as any attempt to shift modes could strip the gearing of the motor and generate unnecessary and potentially damaging loads on the transmission system.

In a preferred form, the output shaft has its forward end operatively connect to the working element and a rearward end connected to the output member and extending along the first housing axis. The input and output members are aligned about the first axis so that reciprocation of the output member and output shaft occurs along the first axis and rotation of the input and output members occurs about the first axis. The alignment of the transmission components about the housing axis minimizes space requirements in the housing therefor to allow the tool to have a more compact design which is desirable for hand-held tools, as previously discussed.

In a preferred form of the invention, a power tool is provided having a working element adapted to be held in a collet of a tool for rotary and reciprocating motion thereof. The tool includes a reversible motor for providing rotary output in one rotary direction and in a rotary direction opposite to the one direction. A housing has a forward end portion to which the collet is mounted and a rearward end portion containing the motor of the tool. An output shaft is attached to the collet and mounted in the housing along a first axis thereof. A transmission system is provided in the housing for converting the rotary output of the motor into either one of rotary or reciprocating motion of the output shaft and attached collet and working element. The transmission system includes rotary cooperating portions aligned with the output shaft for driving the shaft for rotation or reciprocation. The cooperating portions have an engaged state which causes the output shaft to rotate and a disengaged state which causes the output shaft to reciprocate. A control actuator is provided having a control lever portion exterior of the housing for being shifted by an operator and an actuator portion in the housing which changes the direction of rotation of the motor. A stop mechanism of the actuator portion and one of the rotary cooperating portions is provided. The stop mechanism provides the cooperating portions with relative rotary movement therebetween for reciprocating the output shaft.

BRIEF DESCRIPTION OF THE DRAWINGS

FIG. 1 is a perspective view of a power tool in accordance with the present invention showing a housing having a collet assembly mounted at its forward end;

FIG. 2 is an exploded perspective view of a rotary/reciprocating transmission system and collet assembly of the power tool of FIG. 1 showing input and output members of the transmission and an inner body and outer sleeve of the collet assembly;

FIG. 3 is an exploded perspective view of the power tool of FIG. 1 showing the rotary/reciprocation transmission system and the motor therefor, a motor on/off switch, a control actuator for the motor, a PCB including linear switches for the motor, and the collet assembly;

FIG. 4 is a side elevational view of the interior of the housing showing the rotary/reciprocating transmission system and motor therefor and collet assembly assembled therein;

FIG. 5 is an enlarged cross-sectional view taken along line 5—5 of FIG. 3 showing the transmission system in its reciprocating mode with a holding member received in a seat of the output member so that the transmission system is in its reciprocating mode of operation;

FIG. 7B is a view taken along line 7B—7B of FIG. 6 showing the actuator shifted so that its other leg engages the switch projection to change the direction of the motor rotary output;

FIG. 8B is a view taken along 8B—8B of FIG. 6 showing another cam member of the actuator lifting the holding member out from the seat;

FIG. 9 is a cross-sectional view showing the clutch in its disengaged condition with a pawl of the clutch camming over teeth as the transmission input member is rotated in one direction;

FIG. 10 is a cross-sectional view similar to FIG. 9 showing the input member rotated in the opposite rotary direction with the pawl locked into one of the teeth of the outer member;

FIG. 26 is a perspective view of the collet assembly and a shaft of a tool bit for being releasably received in the collet assembly;

FIG. 27 is an exploded perspective view of a collet assembly showing a collet outer sleeve, output shaft, and an inner body of the collet assembly including a spring retaining member and an optional take-up spring;

FIG. 28 is a cross-sectional view of the collet assembly prior to insertion of the tool shaft into a bore of the collet inner body;

FIG. 29 is a view taken along line 29—29 showing the take-up spring including portions projecting into the bore of the collet inner body;

FIG. 30 is a cross-sectional view of the collet assembly showing the bit shaft inserted in the inner body bore with the retaining spring received in a recess on the shaft;

FIG. 31 is a cross-sectional view taken along line 31—31 of FIG. 30 showing the portions of the take-up spring gripping the bit shaft;

DETAILED DESCRIPTION OF THE PREFERRED EMBODIMENTS

Figure 6:
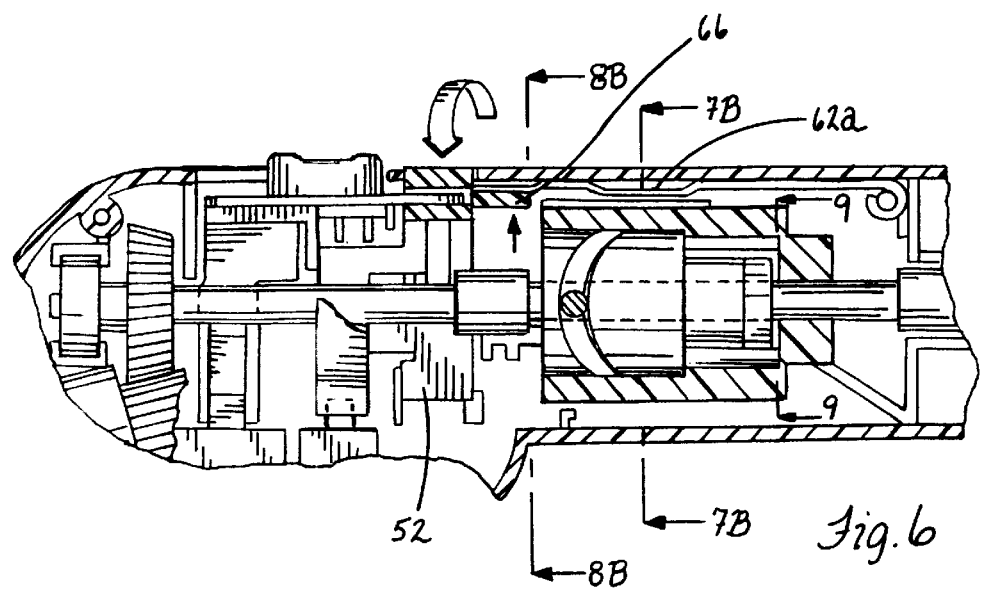
FIG. 6 is a view similar to FIG. 5 showing the control shifted to change the direction of the motor rotary output and to lift the holding member out of the seat so that the transmission system is in its rotary mode of operation.

In FIG. 1, a power tool 10 in accordance with the present invention is illustrated. The power tool 10 herein has a transmission system 12 (FIG. 2) that provides a working element with two distinct types of motion, i.e. rotary or reciprocating. The working element is attached to the power tool 10 via a collet assembly 14 and a tool shaft 16, such as shown in FIG. 26. The tool 10 includes an elongate housing 18 having a forward end portion 20 and a rearward end portion 22 with the collet assembly 14 being mounted at the housing forward end portion 20.

As mentioned, the transmission system 12 is adapted to provide rotary or reciprocating motion to the tool bit held by the collet assembly 14. In this regard, the transmission system 12 converts the rotary output provided by motor 24 into either rotary or reciprocating motion of output shaft 25 which is operatively connected to the collet assembly 14, as will be described in more detail hereinafter. The transmission system 12 herein is advantageous in that while able to convert the motor output into either rotary or reciprocating motion of the output shaft 25, the transmission system 12 still has a very compact design minimizing the amount of space it requires in the housing 18. This allows the housing 18 to have a smaller design advantageous for the hand-held power tool 10 described herein.

More particularly, the rotary/reciprocating transmission system 12 has rotary cooperating portions in the form of an input member 26 that is driven by the motor 24 for rotation, and an output member 28 which is connected to the output shaft 25 for providing it with either rotary or reciprocating motion depending on the selected mode by the user. To provide the transmission 12 with dual modes of operation, a clutch 30 and a cam mechanism 32 are provided so that the input and output members 26 and 28 have engaged and disengaged states with the clutch 30 engaged and disengaged, respectively; and the cam mechanism 32 causes the output member 38 to reciprocate when the clutch is disengaged, as will be described herein. In the preferred form, the transmission 12 can be a so called "barrel cam transmission" with the output member 28 including a substantially cylindrical portion 34 having an interior space 36 therein. The input member 26 can have a two part construction and be mounted in the interior space 36. As discussed, the transmission 12 herein has a very compact design, and to this end, the clutch 30 and cam mechanism 32 can be provided between the input member 26 and output member 28 in the interior space 36.

The output shaft 25 is aligned along a first housing axis 38 and the input and output members 26 and 28 are also aligned along the axis 38 and mounted for rotation thereabout with the output member 28 connected to the output shaft 25 and the input member 26 connected to an intermediate shaft 39. The alignment of the components of the transmission system 12 herein eliminates the lateral space requirements of prior transmissions which used components such as counter shafts and the like offset from the main output shaft in order to obtain dual modes of operation. As the present transmission system 12 has the input and output members 26 and 28 and the output shaft 25 and intermediate shaft 38 all aligned along the housing axis 38, the housing 18 and in particular, portion 40 thereof including the forward end 20 and containing the aforedescribed transmission components therein can be provided with a smaller size especially in the lateral dimension transverse to the axis 38. Accordingly, the compact transmission 12 herein provides for a smaller more compact hand-held tool 10.

To allow the user to select between either the rotary mode or reciprocating mode of operation for the tool 10 herein, a control actuator 42 is provided. In the preferred form, the control actuator 42 is a rotary actuator and is mounted to the housing portion 40 which, as shown, has a curved or arcuate shape thereto about the central axis 38 thereof. To this end, the rotary actuator 42 can be rotated about the axis 38 and includes a control lever portion 44 exterior of the housing 18 which can be shifted by an operator between first and second positions corresponding to the rotary and reciprocating modes of operation and an actuator portion 46 in the housing for purposes as described herein.

Figure 7A:
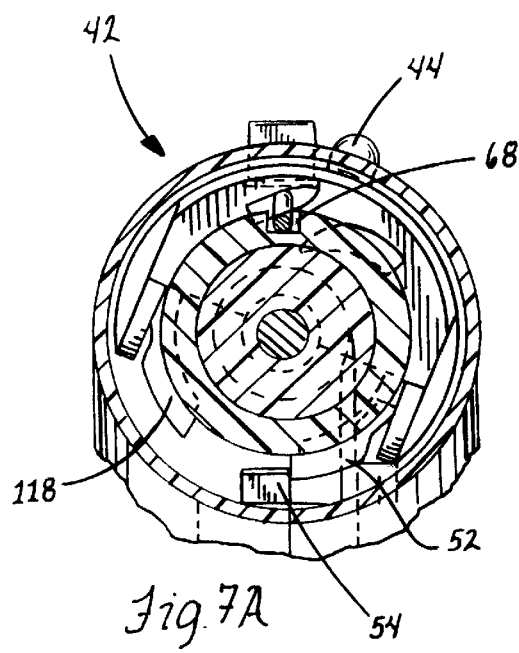
FIG. 7A is a view taken along line 7A—7A of FIG. 5 showing a leg of the actuator shifting a projection of a linear switch for changing the direction of the motor output.
Figure 8A:
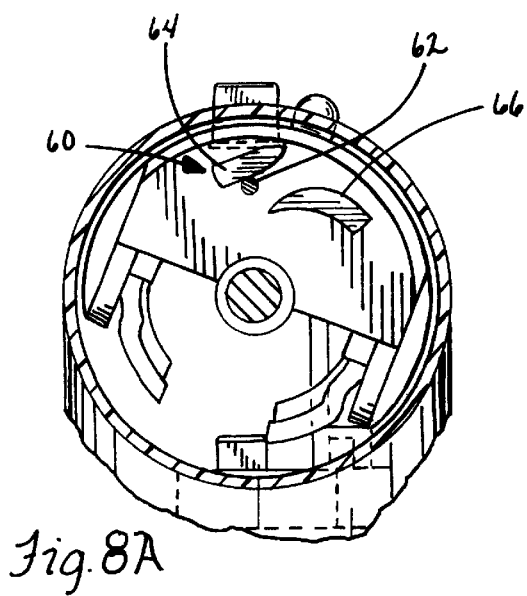
FIG. 8A is a view taken along 8A—8A of FIG. 5 showing a cam member of the actuator urging the holding member into the seat.

The motor 24 of the transmission system 12 is reversible so that its rotary output is in either forward or reverse directions of rotation as indicated by arrows 48 and 50 in FIGS. 9 and 10. Referring to FIGS. 5, 7A and 8A, with the rotary actuator 46 rotated so that the control portion 44 is in the right endmost position as shown, the actuator portion 46 and in particular leg portion 52 thereof will engage and shift a projection 54 of a linear switch 56 mounted to PCB 58 in the housing portion 40. The linear switch 56 controls the polarity of the motor 24 and thus the rotary output therefrom. In this regard, the output will be in the direction of arrow 48 of FIG. 9 for causing reciprocating motion of the output shaft 25, as described hereafter.

With the rotary actuator 42 shifted to the reciprocating position, a stop mechanism 60 will be operable so that the input and output members 26 and 28 are rotatable relative to each other. More specifically, the stop mechanism 60 includes a holding member 62 in the form of an elongate spring fixed at its forward end in the housing and having its rearward end disposed between a pair of cam members 64 and 66 formed on the actuator portion 46 of the rotary actuator 42, as best seen in FIGS. 8*a* and 8*b*. In the reciprocation mode, the actuator portion 46 will be shifted so that the cam member 64, and in particular curved cam surface 64*a* thereof, engages the spring 62 and urges an intermediate portion 62*a* thereof into an axial seat or channel 68 formed on the exterior of the output member cylindrical portion 34. In this manner, the output member 28 is restricted from rotation once the channel 68 thereof is aligned with the fixed position of the spring 62 relative to the rotary path of the output member 28. It is also contemplated that the holding member 62 can be biased to its operative position thus eliminating the need for cam member 64.

As previously described, the clutch 30 is provided between the input member 26 and the output member 28, as best seen in FIGS. 9 and 10. The preferred clutch 30 is a one-way clutch in the form of a pawl and ratchet clutch where the pawl 70 is pivotally attached to the forward end face 72 of the input member 26, and in particular to a recessed portion 72*a* thereof. The ratchet teeth 74 are formed about the interior of the output member cylindrical portion 34 and include ramp surfaces 76 and abutment surfaces 78. With the motor output in the direction of arrow 48, the pawl 70 will pivot outwardly due to centripetal force so that its distal end 80 extends beyond the end face 72 and into engagement with the teeth 74 and the pawl end 80 will cam over the ramp surfaces 76 so that it will not lock into the teeth. Because the holding spring 62 is received in the output member seat 68, the rotation of the input member 26 will not cause rotation of the output member 28 as the clutch 30 is in its disengaged condition and the output member 28 is fixed by the spring 62 so that relative rotation occurs between the input and output members 26 and 28.

As there is only a single seat channel 68 in the output member 28, it is likely that when the motor 24 is energized, the seat 68 will not be aligned with the fixed position of holding spring 62. There are sufficient frictional forces in the transmission system 12 such as due to impingement of the pawl 70 on the teeth 74, that there may be some rotation of the output member 28 and thus output shaft 25 before the seat 68 moves into alignment with the holding spring 62 to stop further rotation of the output member 28. This situation is beneficial in that in this manner, the output member 28 will always be in a predetermined rotary orientation thereof when it is reciprocating. Accordingly, the output shaft 25 and attached collet assembly 14 will always be in predetermined known orientation when the tool 10 is in its reciprocating mode. This allows a user to predictably insert a tool bit in the collet 14 in a desired orientation for providing reciprocating movements of whatever working element they may want to use in this mode. To this end, an indicia 81 can be provided at the forward end of the collet 14 such as in the form of an arrow so that when the arrow 81 is pointing in a certain predetermined direction, e.g. directly down, the user will know that the collet 14 will reciprocate in this orientation thereof.

Figure 13:
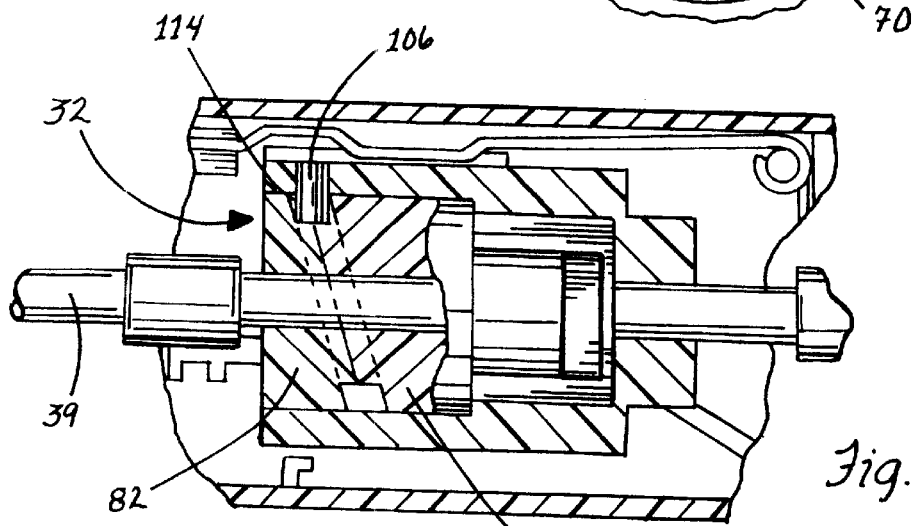
FIG. 13 is a side sectional view taken through the input and output members of the transmission showing the holding member in the output member seat and a cam follower of the output member in a cam track of the input member with the transmission in its reciprocating mode of operation.
Figure 14:
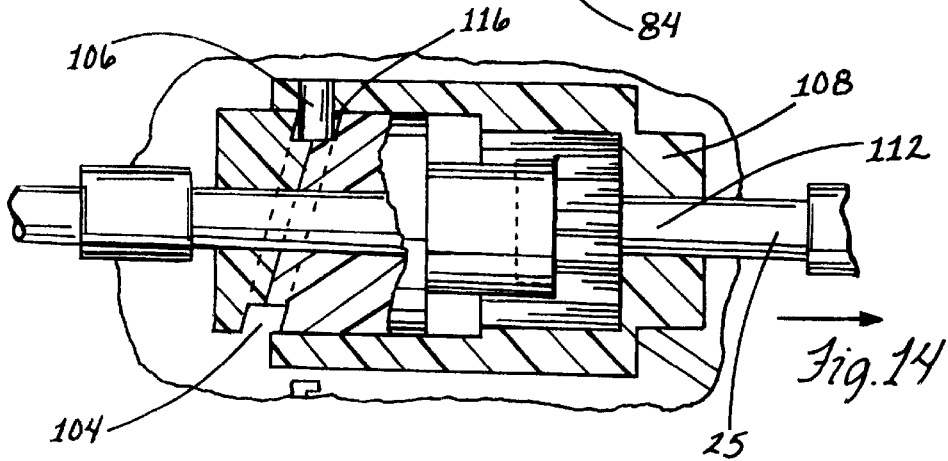
FIG. 14 is a view similar to view 13 showing the input member rotated relative to the output member to cause the output member to reciprocate.
Figure 15:
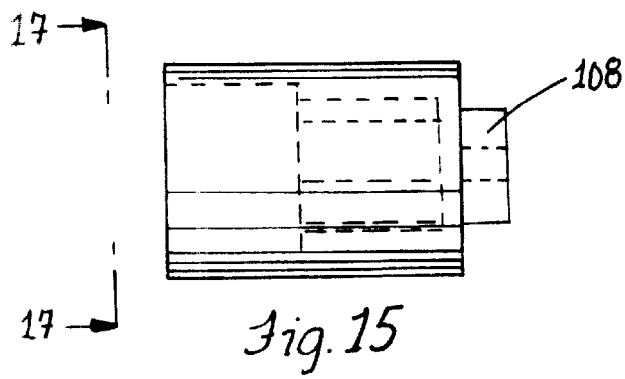
FIG. 15 is a side elevational view of the output member.
Figure 16:
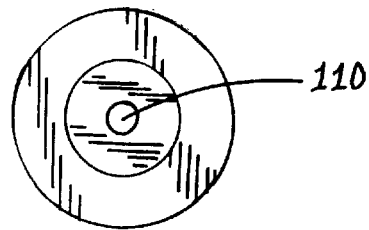
FIG. 16 is front end elevational view of the output member.
Figure 18:
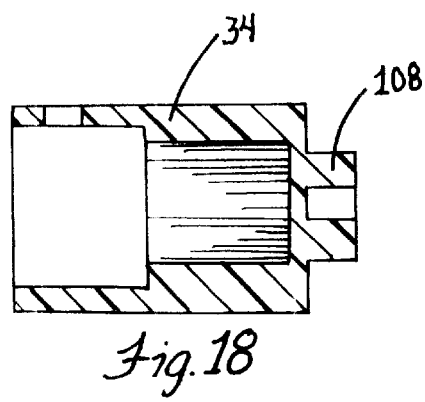
FIG. 18 is a cross-sectional view of the output member taken along line 18—18 of FIG. 17.
Figure 17:
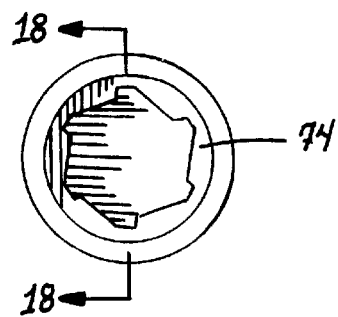
FIG. 17 is a rear end elevational view of the output member showing the interior thereof including the teeth formed thereabout.
Figure 19:
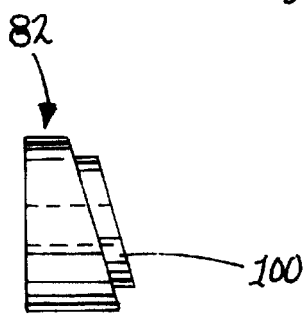
FIG. 19 is a side elevational view of one of the two parts that are attached to form the input member.
Figure 20:
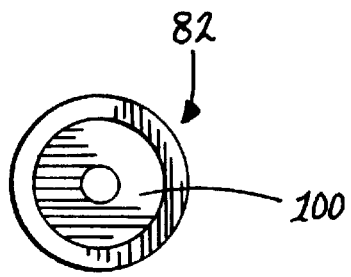
FIG. 20 is a front end elevational view of the input member one part.
Figure 21:
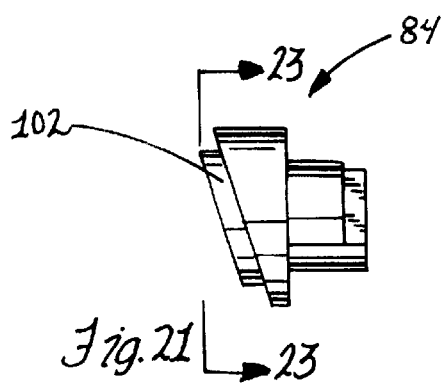
FIG. 21 is a side elevational view of the other part of the input member.
Figures 22, 23:
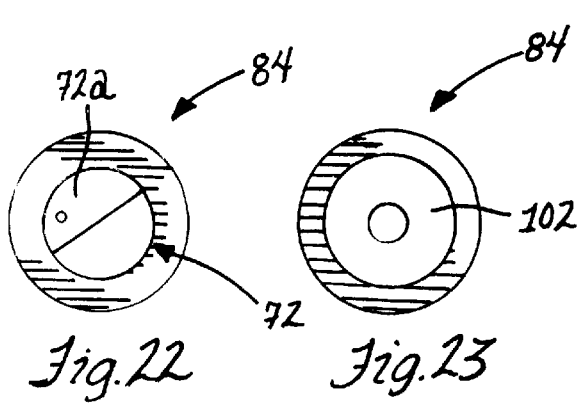
FIG. 22 is a front end elevational view of the input member other part.
FIG. 23 is a rear end elevational view of the input member second part.

With the input and output members 26 and 28 in the disengaged state as described above, the cam mechanism 32 is operable to provide the output member 28 with reciprocating movement in a back and forth axial direction along axis 38 with the spring 62 sliding in seat 68 as the output member reciprocates. Referring to FIGS. 13 and 14, the input member 26 has first and second parts 82 and 84 which are mounted to a reduced end portion 86 of the intermediate shaft 39 by way of openings 88 and 90 of the first and second parts 82 and 84 aligned with respective openings 92 and 94 provided in the shaft portion 86 via mounting pins 96 and 98. Each of the first and second parts 82 and 84 include complementary reduced diameter annular portions 100 and 102 that are angled relative to a normal position with respect to the axis 38. With the input member parts 82 and 84 mounted to the shaft 39, the annular portions 100 and 102 cooperate to form a cam track 104 thereabout into which a cam follower pin 106 projects. The pin 106 is mounted to the output member cylindrical portion 34 so as to project into the interior space 36 and the input member track 104.

Accordingly, with the actuator 42 shifted to the reciprocating mode position and the output member 28 held from rotation by the holding spring 62 as received in the seat 68, the action of the pin 106 in the cam track 104 will drive the output member 28 for reciprocating movement along the axis 38. As shown, the output member 28 includes a reduced diameter forward portion 108 having a D-shaped opening 110 for receiving a correspondingly shaped reduced portion 118 at the rear end of the output shaft 25. Thus, reciprocation of the output member 28 along axis 38 similarly causes reciprocation of the output shaft 25 and the collet assembly 14 and tool bit held therein.

As can be seen in FIGS. 13 and 14, the configuration of the cam track 104 defines the amount of reciprocation or stroke that the tool bit will have. In FIG. 13, the pin 106 is at point 114 in the cam track 104 which is the rearward most axial position of the track 104 on the input member 26. Rotation of the input member 26 by 180 degrees brings the forwardmost point 116 of the track 104 into alignment with the pin 106 which causes the output member 28 to translate to its forwardmost position along axis 38. Continued rotation of the input member another 180 degrees causes the output member 28 to translate back rearwardly to the position of FIG. 13 so that one full rotation of the input member 26 produces one full complete stroke of the tool bit.

To shift the tool 10 into its rotary mode of operation, the lever 44 of the rotary actuator 42 is shifted to the left, as shown in FIGS. 7B and 8B. In this position, the actuator portion 46 will be rotated about axis 38 sufficiently so that the end of leg 118 opposite leg 52 engages the switch projection 54 and shifts it linearly so as to change the polarity and thus the rotary output of the motor 24 to the rotary direction indicated by arrow 50 in FIG. 10. Referring to FIG. 6, the actuator portion 46 is disposed rearwardly of the input and output members 26 and 28 in the housing portion 40 and the rearward end of the spring holding member 62 extends rearwardly beyond the end of the members 26 and 28 and between the cam members 64 and 66, as previously described. Accordingly, when the actuator portion 46 is rotated as shown in FIGS. 7B and 8B, the cam members 66 will engage the rear end of the spring 62 with curved cam surface 66*a* thereof such that at the rotary mode position of the control lever 44, the spring 62 will be lifted so that the portion 62*a* thereof in the outer member seat 68 is lifted out therefrom. Accordingly, the output member 28 is no longer restrained from rotation by the spring holding member 62.

Referring to FIG. 10, with the input member 26 rotating in the direction of arrow 50, the pawl 70 will pivot out into the ratchet teeth 74 and its distal end 80 will lock into the teeth 74 by abutting against the surface 78 of one of the teeth 74. In this manner, rotation of the input member 26 causes the output member 28 to rotate therewith in a secure fashion. Once the pawl 70 is locked into the ratchet teeth 74 which will occur almost immediately upon rotation of the input member 26, the output member 28 will rotate with the input member 26 in their engaged state with the clutch 30 in the engaged condition and transmit rotary motion to the output shaft 25 and the collet assembly 14 and tool bit held therein. The present pawl and ratchet tooth clutch 30 will remain engaged in the rotary mode regardless of forces applied to the output shaft 25. Further, in the reciprocating mode, the clutch 30 provides for a smooth free wheeling action of the output member 28 about the input member 26 so as to provide a smooth, continuous reciprocating action for the tool bit during tool operations.

Figure 11:
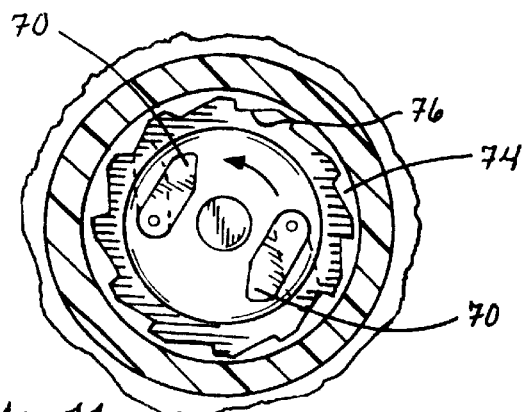
FIG. 11 is a sectional view similar to FIG. 9 showing an alternative form of the clutch where two pawls are provided and are camming over the teeth as the input member is rotated.
Figure 12:
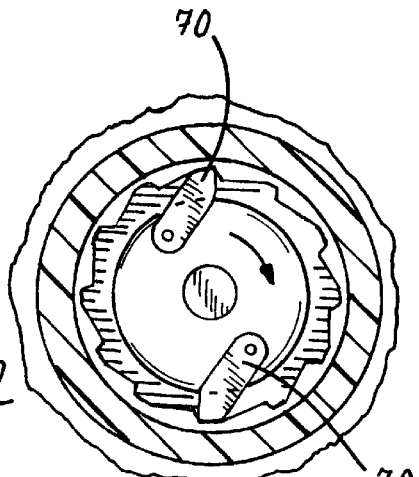
FIG. 12 is a view similar to FIG. 11 showing the pawls pivoted out to lock into respective teeth of the outer member.

FIGS. 11 and 12 depict an alternate form for the clutch 30 where a plurality of pawls 70 are eccentrically mounted to the input member 26. As shown, two pawls 70 are mounted at diametrically opposite positions on the input member end face 72 and the number of ratchet teeth 74 formed in the output member 28 is increased over that shown in FIGS. 9 and 10 for the single pawl clutch 30. FIG. 11 depicts the reciprocating mode of operation where the clutch is in its disengaged condition and the pawls 70 ride over the ramp surfaces 76 of the teeth so that the input and output members 26 and 28 are in their disengaged state and rotate relative to each other, as previously described. FIG. 12 shows the input member 26 rotating in the opposite direction in the rotary mode of operation of the tool 10 with both pawls 70 pivoted out into a locked condition in the teeth 74 to provide further engagement area between the pawls 70 and teeth 74 over the single pawl clutch 30.

Figure 24:
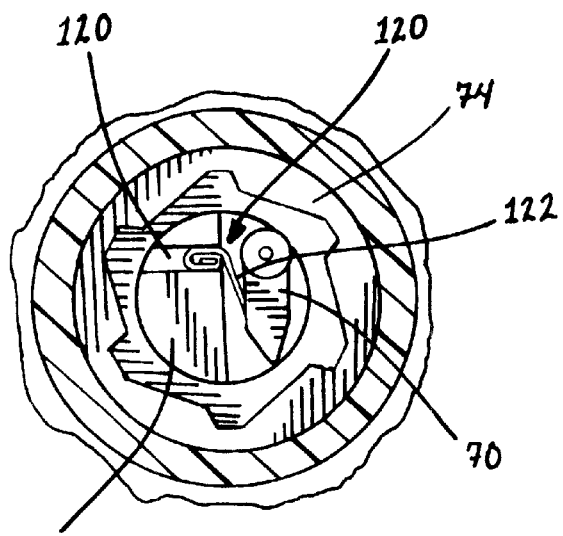
FIG. 24 is an end elevational view partially in section taken through the input and output members showing another form of the clutch with the pawl being biased by a torsion spring towards the teeth.
Figure 25:
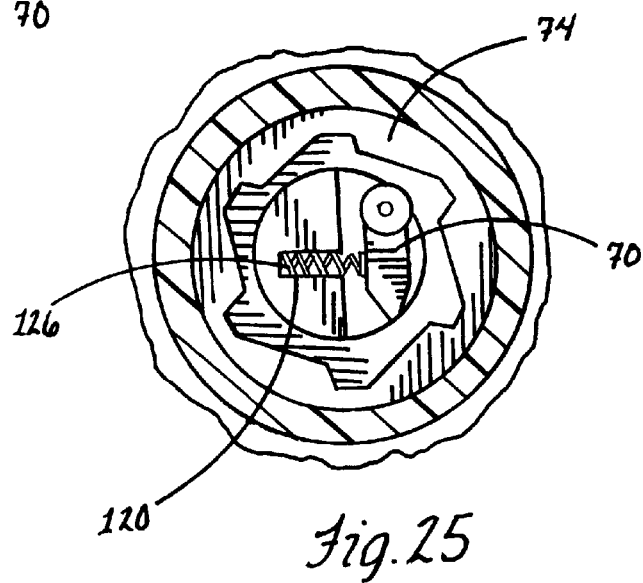
FIG. 25 is a view similar to FIG. 24 showing yet another form of the clutch where the pawl is biased by a compression spring toward the teeth.

Referring to FIGS. 24 and 25, alternative designs for the single pawl clutch 30 are shown. Each of these alternative forms utilize a spring bias force to urge the pawl 70 toward the ratchet tooth 74 so that the pivoting of the pawl 70 does not rely exclusively on centripetal force generated by rotation of the input member 26. As earlier described, the single pawl 70 is pivotally pinned to a recessed portion 72a of the input member end face 72. Accordingly, the end face 72 includes a raised portion 72b adjacent the recessed portion 72a and in which a mounting opening 120 can be provided. In the form of FIG. 24, the spring bias is obtained by the lever arm 122 of a torsion spring 124, while in FIG. 25, the outward bias force on the pawl 70 is obtained by a compression spring 126, with the springs 124 and 126 being mounted in their respective openings 120. In both cases, the springs 124 and 126 serve to insure that the pawl 70 achieves and maintains secure engagement in the teeth 74 when the clutch 30 is engaged.

To energize and de-energize the motor 28, a motor on/off switch 128 is provided on the housing portion 40, as shown in FIGS. 1, 3 and 5. The motor switch 128 has a fork actuator portion 130 extending into the housing portion 40 for operating linear switch 132 mounted on PCB 58. Accordingly, sliding the switch 128 will cause the fork actuator 130 to slide switch projection 134 of the linear switch 132 to either a motor "off" position where the motor 24 is de-energized or a motor "on" position where the motor 24 is energized.

In order to minimize shock loads on the motor gearing such as the output pinion gear 136 of the motor and the bevel face gear 138 meshed therewith, it is desirable to prevent shifting of the rotary actuator 42 when the motor 24 is running. Accordingly, an interlock is provided between the motor switch 128 and the rotary actuator 42 so that with the motor switch 128 shifted to the "on" position, a user can not shift the rotary actuator from the reciprocating mode position to the rotary mode position thereof.

As previously described, the rotary actuator 42 pivots or rotates about the axis 38, whereas the motor switch 128 slides linearly between the "off" and "on" positions transverse to the acuate path of the rotary actuator 42. The switch 128 has a mounting plate 140 from which the fork actuator 130 depends. Projecting up from the plate 140 is the switch knob 142 for being engaged by a user to slide the plate 140 and fork actuator 130 forward and back in a linear path transverse to the acuate path of the control 42. The upper surface of the plate 140 forwardly of the knob 142 includes a elongate recess or channel 144. The rotary actuator 42 has opposite projections 146 and 148 formed on the inner surface of its legs 52 and 118. When the rotary actuator 42 is rotated to its right endmost position for putting the tool in the reciprocating mode of operation, the projection 146 will be shifted into alignment with the switch channel 144 so as to allow the motor switch 128 to be shifted from its rearward "off" position to the forward "on" position with the projection 146 sliding in the channel 144. Any attempt to rotate the lever portion 44 to the left for putting the tool into the rotary mode of operation while the motor switch 128 is in its forward "on" position will cause the projection 146 to abut against the walls of the channel 144 preventing rotation of the actuator until the switch 128 is slid rearwardly to its "off" position. In the "off" position of the switch 128, the projection 146 is shifted out from the channel 144 to allow rotation of the actuator 42.

Similarly, the switch 128 can not be shifted from its "off" position to its "on" position unless the rotary actuator 42 is in the reciprocating mode position at the right endmost point in its arcuate path or in the rotary mode position in the left endmost position of its path as otherwise one or the other of the projections 146 and 148 will interfere with the forward sliding of the switch plate 140 acting as stops as they will not be aligned with the channel 144 in the plate 140. This is important to insure proper operation of the tool 10 so that the motor 24 can not be energized before the holding member 62 and the switch projection have been properly actuated by actuator portion 46 of the control actuator 42, as has been previously described.

Turning next to some of the details of the construction of the power tool 10 herein, the housing 18 in its preferred form has a rear housing portion 150 including the rear end 22 and aligned about longitudinal axis 152 thereof with the axis 152 being slightly angled relative to axis 38 of housing portion 40 at an obtuse angle thereto. In this manner, the housing 18 has a gun-type design where the rear housing portion 150 can be used as a handle for gripping by an operator to manipulate the tool into hard-to-reach areas for providing access thereto with the working element. In addition, the rear housing portion 150 can contain the motor 24 therein with the transmission system 12 contained in the housing portion 40, as previously described.

Referring next to FIGS. 2 and 3, the motor 24 can be provided with a fan 154 disposed at the rear thereof with the housing having cooling slots 156 formed at the rear end portion 22 thereof to minimize potential overheating during tool operations. The housing 18 preferably has a clam-shell construction with housing half 158 and housing half 160 that can be molded plastic parts and secured together along part line via fasteners (not shown). An electrical cord 162 extends out from the rear end 22 of the housing 18 when the portions 158 and 160 are attached for providing power to the motor 24.

The housing halves 158 and 160 are provided with a plurality of integral bracket members 162 therein that are designed to clamp against bearings and support the motor 24 and PCB 58 in the housing 18 when the housing halves 158 and 168 are attached. A ring bearing 164 is provided at the end of intermediate shaft 39 rearwardly of gear 138 to support the intermediate shaft 39 for rotation as driven by the motor gear 136. To support the output shaft 25, a pair of guide bushings 166 and 168 are provided between the forward end portion 108 of the transmission output member 28 and the rear of the collet assembly 14. A similar bushing 170 can also be provided at the forward end of the intermediate shaft 39.

In FIG. 26, the collet assembly 14 is shown with the tool bit shaft 16 removed therefrom. The collet assembly 14 has a very few number of parts and is easily and quickly assembled. Referring to FIG. 27, the collet assembly 14 includes an inner body or core member 172, an outer collet sleeve 174, and a retaining member in the form of wire form spring 176. The body 172, sleeve 174 and retaining spring 176 can be manually assembled without requiring any special alignment mechanisms, tools or machinery for this purpose. The assembly procedures simply involve mounting the retaining spring 176 to the body 172 via openings 178 and 180 therein, and inserting the body 172 and spring 176 mounted thereto into the collar 174 until front circular face flange 182 of the body 172 abuts shoulder stops 184 and 186 provided at diametrically opposite positions in the collar bore 188, as can best be seen in FIGS. 37–39. The inner body 172 projects beyond the rear of the collet sleeve 174 for being attached to the output shaft 25, as described hereinafter.

An important advantage afforded by the present collet assembly 14 is the use of the retaining spring 176 rather than the detent balls or the like as found in many prior collets. To this end, the tool bit shaft 16 is provided with a recess 188 thereabout at a predetermined position from a tapered end 190 thereof.

Figure 32:
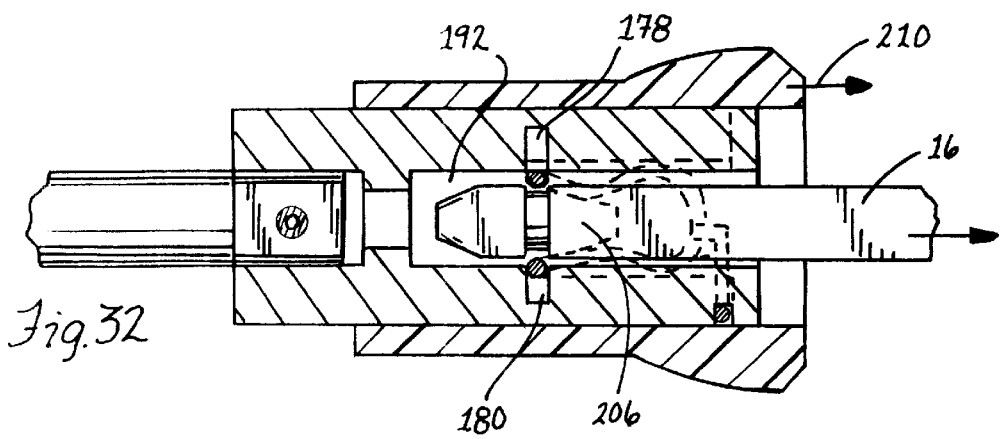
FIG. 32 is a cross-sectional view similar to FIG. 30 showing the outer sleeve slid forwardly relative to the outer body to shift a cam wedge member into engagement with a control portion of the retaining spring for shifting leg portions of the retaining spring out from the bit shaft recess.
Figure 33:
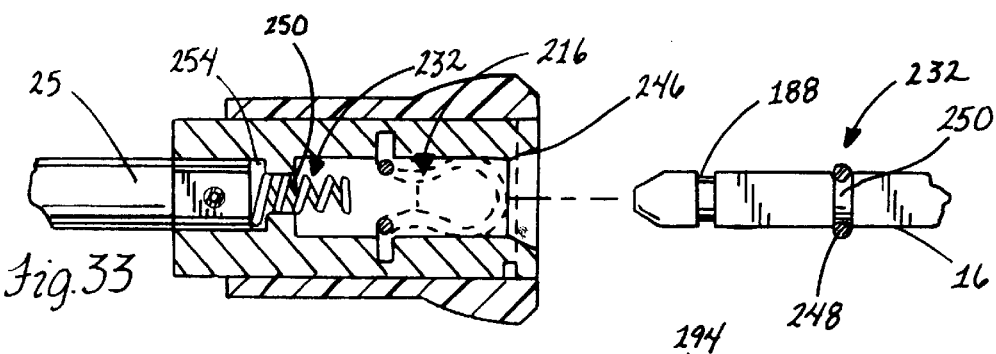
FIG. 33 is a sectional view of the present collet assembly including a compression spring disposed at the rear of the inner body bore and a take-up resilient member on the shaft.
Figure 34:
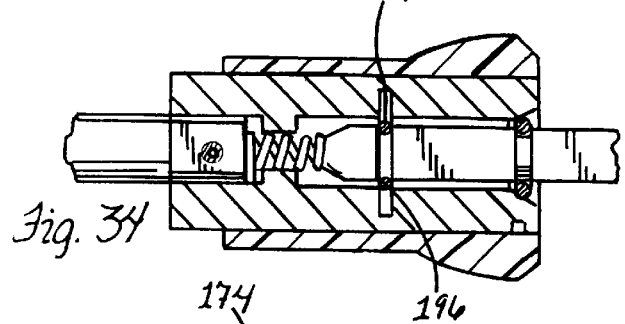
FIG. 34 is a view similar to FIG. 33 showing the shaft inserted and releasably held in the bore with the end of the shaft engaged with the compression spring and the take-up resilient member in a counter-sunk portion of the bore.
Figure 35:
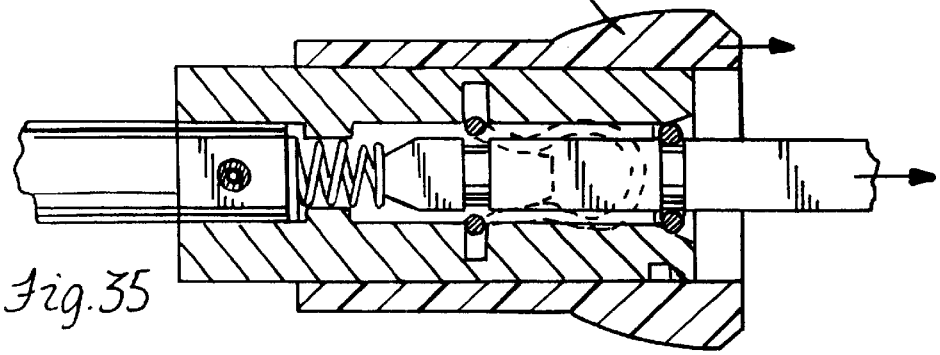
FIG. 35 is an enlarged cross-sectional view similar to FIG. 34 showing the collet outer sleeve slid forwardly to release the leg portions of the retaining spring from the bit shaft recess with the compression spring urging the shaft forwardly out from the bore.
Figure 36:
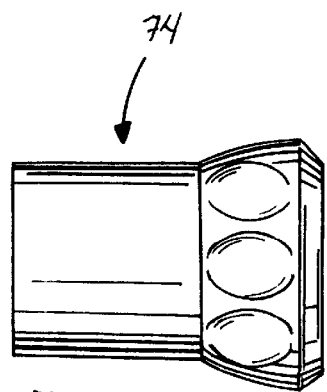
FIG. 36 is a side elevational view of the collet outer sleeve.

The collet inner body 172 has a bore 192 having a substantially matching cross-sectional configuration to that of the tool bit shaft 16 which, as shown, have a polygonal or square shape in the preferred form. The openings 178 and 180 extend vertically to the collet body into communication with the bore 192. The spring retaining member 196 includes a pair of leg portions 194 and 196 spaced at a predetermined lateral distance from each other so that when they are inserted into the openings 178 and 180 they project into the bore 192 at a predetermined axial position therein, as best seen in FIGS. 30–32. In this manner, when the shaft 16 is inserted into the bore 192, it will be releasably held therein vis-a-vis spring legs 194 and 196 received in the shaft recess 188 at the predetermined position in the bore 192.

It has been found that it is important for the width of the slot openings 178 and 180 to be approximately the same or slightly greater in size than the gauge diameter of the wire form spring retaining member 176, and in particular, to the leg portions 194 and 196 thereof. This is because as the shaft 16 is inserted, ramp surface 198 about the tapered end of the shaft 16 cams against the spring legs 194 and 196 urging them outwardly against the rear walls 178a and 180a of the slots 178 and 180 so that they can be forced outwardly and guided against these walls. If the slots 178 and 180 were not approximately the same size as the diameter of the spring legs 194 and 196, the camming action provided by ramp surface 198 instead of pushing the springs legs 194 and 196 against the slot back walls 178a and 180a, may cause one or both of the legs 194 and 196 to get jammed between the shaft 16 and bore walls 192a potentially damaging the legs 194 and 196.

As previously discussed, the collet assembly 14 herein utilizes spring retaining legs 194 and 196 to releasably hold the tool bit shaft 16 and does not rely upon detent balls and actuating ramps therefor in either the collect or the tool shaft as in many prior collect designs. In this regard, the tolerances for forming the shaft recess 188 are not as tight to ensure the shaft 16 is securely held in the collet assembly 14 while being able to be readily released therefrom. To this end, the recess 188 includes abutment walls 200 and 202 extending thereabout. As shown, the abutment walls 200 and 202 extend normal to the shaft axis so that they do not provide a camming function when inserted or removed from the collet assembly 14. Thus, when the spring legs 194 and 196 are received in the recess 188 they will be confined by the abutment walls 200 and 202 on either side thereof to prevent axial movement of the shaft 16 relative to the collet inner body 172.

On the other hand, it has been found that the height of the walls 200 and 202 from the bottom annular surface 204 should preferably have portions that are at least as the high as the gauge diameter of the spring leg portions 194 and 196. In this manner, play between the shaft 16 and inner body 172 is minimized by the spring legs 194 and 196 engaged against the full height of the walls 202 and 204 in the shaft recess 188.

Figure 37:
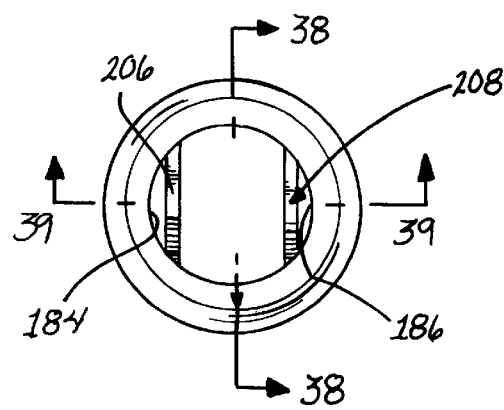
FIG. 37 is a front end view of the sleeve showing wedge cam members therein.
Figure 38:
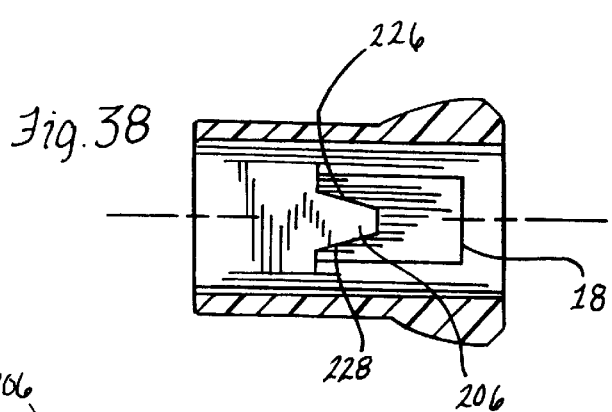
FIG. 38 is a cross-sectional view taken along line 38—38 of FIG. 37.
Figure 39:
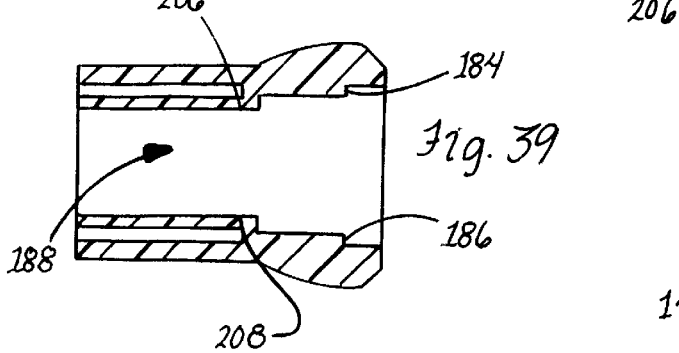
FIG. 39 is a cross-sectional view taken along line 39—39 of FIG. 37.
Figure 40:
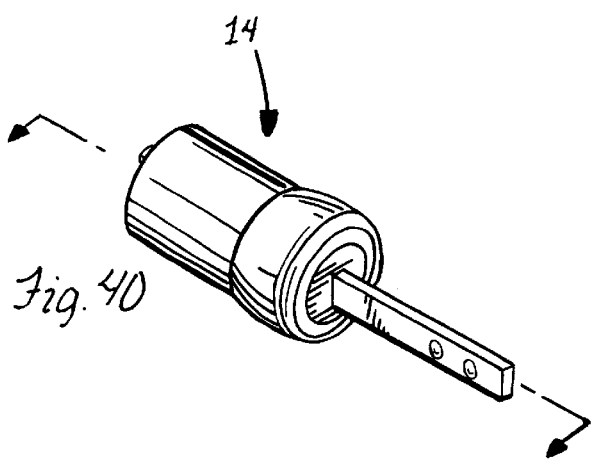
FIG. 40 is a perspective view of another form of a collet assembly and tool bit shaft in accordance with the invention.
Figure 41:
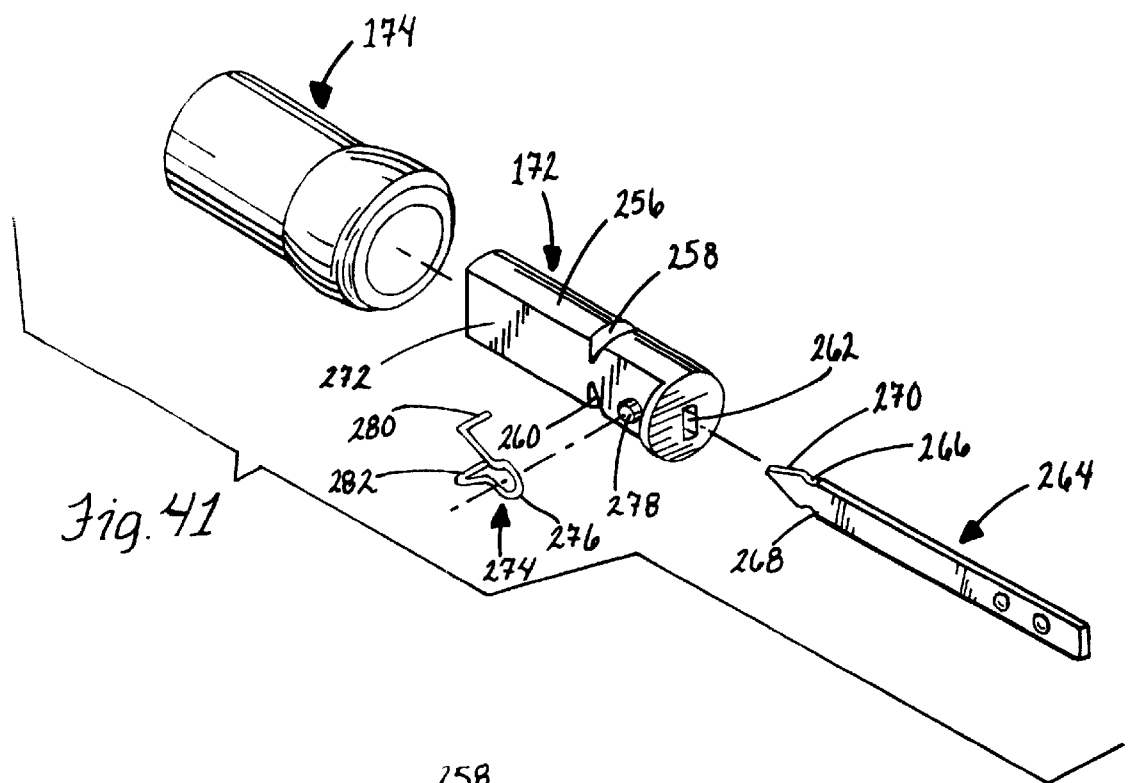
FIG. 41 is an exploded perspective view of the collet assembly of FIG. 40 showing an inner body having notches for the leg portions of the retaining member and a pedestal for mounting the control portion of the retaining member.
Figure 42:
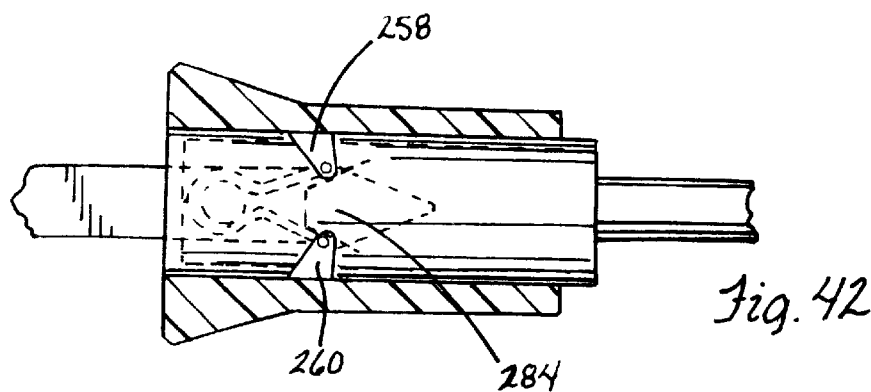
FIG. 42 is an elevational view partially in section showing the shaft releasably held in the bore of the inner body.
Figure 43:
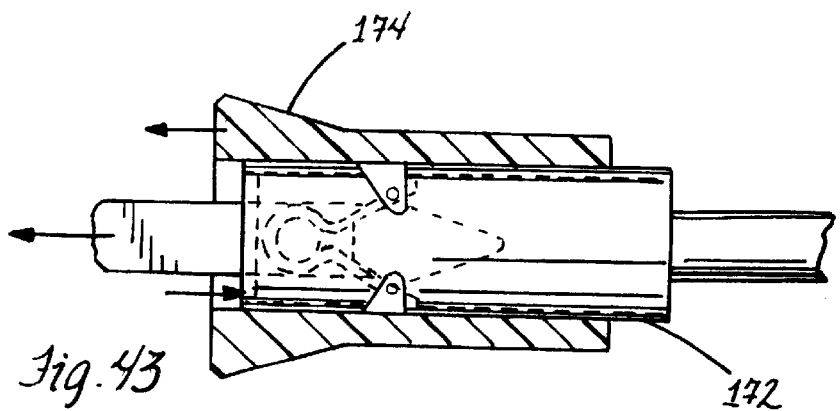
FIG. 43 is a view similar to FIG. 42 showing the collet outer sleeve slid forwardly to cause the cam member to engage the control portion for shifting the retaining member leg portions out from the recess of the bit shaft.

For releasing the shaft 16 from the collet assembly 14, cooperating portions are provided on the retaining spring 176 and the collet sleeve 174 in the form of a control portion 204 of the retaining spring 176 and actuator cams 206 and 208 provided at diametrically opposite directions in the sleeve, as best seen in FIGS. 37–39. The sleeve 174 is mounted about the inner body 172 so as to be able to be slid forwardly relative thereto which causes one of the actuator cams 206 or 208 to engage the control portion 204 which, in turn, causes the spring leg portions 194 and 196 to be shifted out from the shaft recess 188. With the sleeve 174 held forwardly, a user can pull the shaft 16 out from the bore 192 without interference from the spring legs 194 and 196.

More particularly, the collar inner body 172 is connected at its rear projecting end 172a to a forward reduced portion 212 of the output shaft 25 so that when the tool 10 is not turned on, the inner body 172 is fixed against movement in the axial direction. The control portion 204 of the spring retaining member 206 has a predetermined configuration including an arcuate or loop section 214 that opens rearwardly. The arcuate or loop section 214 narrows to a throat portion 216 thereof and from there the spring widens via sections 218 and 220 that taper away from each other until they meet the upper ends of respective leg portions 194 and 196 which depend downwardly therefrom.

As shown, the inner body 172 has a generally rectangular cross-sectional shape with bowed out ends and is disposed so that the flat sides 222 and 224 are at the top and bottom thereof. Rearwardly of the front face flange 182, the surfaces 222 and 224 are lowered at portions 222a and 224a, respectively, so that with the retaining spring legs 194 and 196 inserted into the slot openings 178 and 180 either from the top or the bottom surfaces 222 and 224 of the inner body 172, the throat portion 216 will be raised over the lowered surface portions 222a or 224a with the arcuate section 214 resting on the raised portion of the flats 222 and 224.

The cam actuators preferably have a wedge shape with ramp surfaces 226 and 228 tapering and diverging away from each other in the rearward direction. With the inner body 172 in the outer sleeve 174, the arcuate section 214 of the retaining spring 176 opens rearwardly facing one of the wedge cam actuators 206 or 208. In this manner, forward sliding of the sleeve 174 causes the one cam actuator 206 or 208 to push forward between the tapered sections 218 and 220 and cammingly engage in the throat portion 216 of the retaining spring control portion 204. Accordingly, forward sliding of the sleeve 174 causes the ramp surfaces 226 to spread the throat portion 216 open causing the legs 194 and 196 to spread laterally away from each other and out from the shaft recess 188, as shown in FIG. 32.

While there have been illustrated and described particular embodiments of the present invention, it will be appreciated that numerous changes and modifications will occur to those skilled in the art, and it is intended in the appended claims to cover all those changes and modifications which fall within the true spirit and scope of the present invention.

What is claimed is:

1. An apparatus having a working element capable of rotating or reciprocating, the apparatus comprising:
   an elongate housing having a first longitudinal axis extending therethrough;
   a reversible motor in the housing having forward and reverse states;
   an input member driven in either one of forward or reverse directions of rotation by the motor;
   an output member for providing the working element with either a rotary motion or a reciprocating motion;
   a clutch between the input and output members having an engaged condition with the input member rotating in one of the forward and reverse directions and a disengaged condition with the input member rotating in the other of the forward and reverse directions; and
   a cam mechanism between the input and output members for causing the output member to reciprocate and provide the working element with reciprocating motion with the clutch in the disengaged condition.

2. The apparatus of claim 1 wherein the output has a cylindrical portion defining an interior space and the input member, clutch and cam mechanism are all disposed in the interior space to provide a compact rotary/reciprocating transmission system in the housing.

3. The apparatus of claim 1 wherein the clutch comprises a one-way clutch including a pivotal pawl and teeth so that in the engaged condition of the clutch the pawl is pivoted to lock into one of the teeth to cause the input and output members to rotate together and in the disengaged condition the pawl cams over the teeth to allow the input member to rotate relative to the output member.

4. The apparatus of claim 3 wherein the pawl includes more than one pawl for locking into more than one respective teeth of the clutch.

5. The apparatus of claim 3 wherein the clutch includes a biasing member for urging the pawl toward the teeth.

6. The apparatus of claim 1 including a control actuator for shifting the motor between either one of its forward and reverse states, and
   a holding member shifted by the control actuator between inoperative and operative positions so that in the inoperative position the output member rotates with the input member in the one direction with the clutch in the engaged condition, and in the operative position the output member reciprocates via the cam mechanism and the input member rotates in the other direction with the clutch in the disengaged condition.

7. The apparatus of claim 6 wherein the holding member comprises a resilient member mounted in the housing at a fixed position relative to the rotation of the output member and the output member includes a seat for receiving the resilient member in its operative position so that with the resilient member in the seat the output member is held against rotation with the seat at the fixed position and the resilient member is allowed to slide in the seat so that the output member reciprocates in a predetermined orientation thereof.

8. The apparatus of claim 7 wherein the control actuator includes cam members operable to urge the resilient member into the seat to its operative position and lift the resilient member out from the seat to its inoperative position.

9. The apparatus of claim 1 including a rotary actuator and a linear switch which has first and second positions corresponding to the forward and reverse states of the motor, respectively, with the rotary actuator being rotatable to linearly slide the switch between its first and second positions.

10. The apparatus of claim 1 including a control selectively movable to shift the motor between either one of its forward and reverse states, and a motor on/off switch mounted to the housing selectively movable between an "off" position with the motor de-energized and an "on" position with the motor energized to drive the input member and with the switch in the "on" position the switch interlocks with the control to prevent selective movement thereof precluding the motor from being shifted from one state to the other while it is energized.

11. The apparatus of claim 1 including an output shaft having a forward end operatively connected to the working element and a rearward end connected to the output member and extending along the first housing axis with the input and output members being aligned about the first axis so that reciprocation of the output member and output shaft occurs along the first axis and rotation of the input and output members occurs about the first axis.

12. The apparatus of claim 11 wherein the housing has a forward portion through which the first axis extends and a rearward portion in which the motor is contained and having a second longitudinal axis extending therethrough at an angle to the first axis to allow an operator to grip the rearward portion and angle the forward portion into hard to reach areas for providing access thereto with the working element.

13. A power tool having a working element adapted to be held in a collet of the tool for rotary and reciprocating motion thereof, the power tool comprising:
   a reversible motor for providing rotary output in one rotary direction and in a rotary direction opposite to the one direction;
   a housing having a forward end portion to which the collet is mounted and a rearward end portion containing the motor of the tool;
   an output shaft to which the collet is attached and mounted in the housing along a first axis thereof;
   a transmission system in the housing for converting the rotary output of the motor into either one of rotary or reciprocating motion of the output shaft and attached collet and working element, the transmission system including rotary cooperating portions aligned with the output shaft for driving the shaft for rotation or reciprocation, the cooperating portions having an engaged state which causes the output shaft to rotate and a disengaged state which causes the output shaft to reciprocate;

a control actuator having a control lever portion exterior of the housing for being shifted by an operator and an actuator portion in the housing which changes the direction of rotation of the motor; and a stop mechanism of the actuator portion and one of the rotary cooperating portions operable to provide the cooperating portions with relative rotary movement therebetween for reciprocating the output shaft.

14. The power tool of claim 13 wherein the housing has an arcuate surface portion, the control actuator is a rotary actuator, and the control portion of the rotary actuator is mounted to the arcuate surface portion for being shifted in an arcuate path along the arcuate surface portion.

15. The power tool of claim 14 including a linear switch for the motor in the housing and having a first position with the motor rotary output being in the one direction and a second position with the motor rotary output being in the opposite direction, the actuator portion of the rotary control actuator causing the switch to shift between the first and second positions as the control portion is shifted in the arcuate path.

16. The power tool of claim 14 including a motor on/off switch which is shifted in a linear path transverse to the arcuate path of the rotary actuator for energizing and de-energizing the motor with the linear path intersecting the arcuate path with the switch shifted on to energize the motor; and an interlock between the switch and rotary actuator operable with the switch shifted on to prevent shifting of the rotary actuator in its arcuate path.

17. The power tool of claim 16 wherein the rotary actuator has a first predetermined position in its arcuate path in which the motor rotary output is in the one direction and a second predetermined position in its arcuate path in which the motor rotary output is in the opposite direction, and a stop of the rotary actuator which prevents the motor switch from being shifted to energize the motor with the actuator in other than the first and second positions along the arcuate path.

18. The power tool of claim 13 wherein the transmission system includes a one-way clutch mounted to the rotary cooperating portions which allows relative rotation between the cooperating portions in their disengaged state with the motor rotary output being in the one direction and causing the rotary cooperating portions to rotate together in their engaged state with the motor rotary output being in the opposite direction.

19. The power tool of claim 18 wherein the one-way clutch includes a pivotal pawl and ratchet teeth so that in the engaged state of the cooperating portions the pawl locks into one of the ratchet teeth and in the disengaged state of the cooperating portions the pawl cams over the ratchet teeth.

20. The power tool of claim 13 wherein one of the cooperating portions is attached to the output shaft, and the stop mechanism includes a shiftable member and a channel extending axially in the housing on the one cooperating portion for receiving the shiftable member therein to cause relative rotation between the cooperating portions with the axial channel allowing the shiftable member to slide in the channel as the one cooperating portion reciprocates causing the output shaft to reciprocate.

21. The power tool of claim 20 wherein the channel is single channel on the one cooperating portion and the shiftable member is mounted in a fixed position relative to the rotation of the one rotary cooperating portion so that with the shiftable member in the channel, the one cooperating portion and attached output shaft and collet will be in a predetermined orientation to allow a user to insert a shaft of a working element in the collet in proper orientation for tool operations with the working element undergoing reciprocating motion.

22. The power tool of claim 21 wherein the stop mechanism includes a resilient member which engages one of the cooperating portions in the operative position to prevent rotation thereof, and the actuator member comprises a pair of cam members with one of the cam members operable to cam the resilient member away from the one cooperating portion to the inoperative position and the other cam member operable to cam the resilient member toward engagement with the one cooperating portion to the operative position.

23. The power tool of claim 13 wherein the actuator portion of the control actuator includes at least one actuator member with shifting of the control lever portion causing the actuator member to shift the stop mechanism between an inoperative position with the cooperating portions rotating together and an operative position with relative rotation between the cooperating portions.

* * * * *